United States Patent
Abe et al.

(10) Patent No.: US 10,120,475 B2
(45) Date of Patent: Nov. 6, 2018

(54) DISPLAY DEVICE

(71) Applicant: Japan Display Inc., Tokyo (JP)

(72) Inventors: Hiroyuki Abe, Tokyo (JP); Takayuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 92 days.

(21) Appl. No.: 15/421,581

(22) Filed: Feb. 1, 2017

(65) Prior Publication Data

US 2017/0228077 A1 Aug. 10, 2017

(30) Foreign Application Priority Data

Feb. 8, 2016 (JP) .................................. 2016-022167

(51) Int. Cl.
| | | |
|---|---|---|
| *G06F 3/041* | (2006.01) | |
| *G02F 1/1333* | (2006.01) | |
| *G02F 1/1343* | (2006.01) | |
| *G06F 3/044* | (2006.01) | |
| *G02F 1/1345* | (2006.01) | |

(52) U.S. Cl.
CPC ........ *G06F 3/0412* (2013.01); *G02F 1/13454* (2013.01); *G02F 1/134309* (2013.01); *G06F 3/044* (2013.01); *G06F 3/0416* (2013.01); *G02F 1/13338* (2013.01); *G02F 2201/121* (2013.01); *G02F 2201/56* (2013.01)

(58) Field of Classification Search
CPC .......... G02F 1/13338; G02F 1/134309; G02F 1/13454; G02F 2201/121; G02F 2201/56; G06F 3/0412; G06F 3/0416; G06F 3/044
See application file for complete search history.

(56) References Cited

U.S. PATENT DOCUMENTS

| | | | | |
|---|---|---|---|---|
| 2008/0018583 A1* | 1/2008 | Knapp | ................. | G02F 1/1333 345/99 |
| 2008/0088568 A1* | 4/2008 | Haga | ....................... | G09G 3/18 345/100 |
| 2008/0266210 A1 | 10/2008 | Nonaka | | |
| 2012/0306844 A1 | 12/2012 | Abe et al. | | |
| 2014/0253419 A1* | 9/2014 | Tanada | ................. | G09G 3/2092 345/55 |
| 2014/0375606 A1 | 12/2014 | Abe et al. | | |

(Continued)

FOREIGN PATENT DOCUMENTS

| | | |
|---|---|---|
| JP | 2008-292995 A | 12/2008 |
| JP | 2012-252108 A | 12/2012 |
| JP | 2015-007925 A | 1/2015 |

*Primary Examiner* — Ariel Balaoing
(74) *Attorney, Agent, or Firm* — Typha IP LLC

(57) ABSTRACT

To enable size reduction of a display device having a touch sensor function in which a display area has a non-rectangular shape. In a display area, video lines extend in the first direction, and scan lines and common electrodes extend in the second direction. A video signal transmission circuit is arranged along a first edge of the display area, with which the one ends of the video lines are aligned. A scan line driver is arranged along a second edge of the display area, with which the ends of the scan lines and the common electrodes are aligned. The display area has a shape including an overlapping part between the first edge and the second edge. In a part of the frame area adjacent to the overlapping part, the scan line driver is arranged more outward than the video signal transmission circuit.

8 Claims, 13 Drawing Sheets

(56) References Cited

U.S. PATENT DOCUMENTS

2017/0084225 A1* 3/2017 Nam .................... G09G 3/3225
2017/0110479 A1* 4/2017 Chen .................... H01L 27/124
2017/0309644 A1* 10/2017 Yeh ..................... H01L 27/1218
2017/0322446 A1* 11/2017 Tae ................... G02F 1/133345

* cited by examiner

DISPLAY DEVICE

CROSS-REFERENCE TO RELATED APPLICATION

The present application claims priority from Japanese application No. 2016-022167 filed on Feb. 8, 2016, the content of which is hereby incorporated by reference into this application.

BACKGROUND OF THE INVENTION

1. Field of the Invention

The present invention relates to a display device, and in particular to a display device in which the shapes of a display area and a substrate of a display panel having a touch sensor function are not rectangular.

2. Description of the Related Art

A touch-panel built-in display panel in which a display panel is integrated with a touch panel, that is, a so-called in-cell type display device, is mounted in a variety of electronic devices.

In an active matrix display panel, for example, a scan line is arranged for every pixel row in a display area where pixels are two-dimensionally aligned in a matrix, and a video line is arranged for every pixel column so as to intersect the scan line. Further, circuits for inputting signals to the scan lines and the video lines are arranged in a frame area outside the display area on the substrate of the display panel. Specifically, a pixel row is selected in response to a signal applied to a scan line, and a video signal is inputted to the pixel selected from a video line.

An electrostatic capacitance type touch panel has a detection electrode and a drive electrode. A drive signal is applied to the drive electrode to detect an object, such as a finger, etc., approaching and touching the touch panel, based on an output signal from the detection electrode. In a touch panel built-in display device, a common electrode for applying common potential to the respective pixels of the display panel is divided into a plurality of portions to be used also as drive electrodes of the touch sensor. Circuits for inputting signals to the drive electrodes as well are arranged in the frame area of the substrate.

Generally, the display area of a conventional display panel is rectangular. FIG. 12 schematically shows a layout of a conventional in-cell type display panel. In a rectangular display area 2, scan lines 4 are arranged extending in the horizontal direction (the direction of a pixel row), while video lines 6 are arranged extending in the vertical direction (the direction of a pixel column). Further, a plurality of drive electrodes 8 are arranged in the display area, each having a width covering a plurality of pixel rows and extending in the horizontal direction. In the frame area 10, scan circuits 12 for applying signals to the scan lines 4 and switch circuits 14 and shift register circuits 16, as circuits for applying signals to the drive electrodes 8, are arranged along the left and right sides of the display area 2, and video signal transmission lines and selectors 20 for inputting video signals from a driver IC 18 to the video lines 6 are arranged along the lower side of the display area 2. That is, the circuits for supplying signals to the signal lines and electrodes extending in the horizontal direction in the display area 2 are arranged along a vertical side of the display area 2 with which the ends of the signal lines, etc., are aligned, while the circuits for supplying signals to the signal lines etc., extending in the vertical direction in the display area 2 are arranged along the horizontal side of the display area 2 with which the ends of the signal lines etc., are aligned. That is, these circuits are arranged along respective different sides of the rectangular shape.

SUMMARY OF THE INVENTION

Usage of an in-cell type display panel has been expanded to one that does not require a rectangular display area. For example, as to an automobile speed meter, a game device, a clock, etc., the shapes of a display area and of a product may not be rectangular in view of design. FIG. 13 is a schematic diagram showing a conventional layout of an in-cell type display panel 30 having a display area not rectangular. Specifically, a display area 32 in a barrel shape whose upper and lower edges are defined as straight lines extending in the horizontal direction and left and right edges connecting the upper and lower straight edges each have an arc shape that is convex outward is shown as an example. The scan circuits 12, the switch circuits 14, and the shift register circuits 16 are arranged at positions more outward than the left and right respective ends of the display area 32 in the horizontal direction and extending, for example, straight over the entire vertical width of the display area 32. Further, the selectors 20 and the video signal transmission lines are arranged at a position lower than the lower end of the display area 32 and extending straight over the entire horizontal width of the display area 32. According to this layout, as the circuits, such as the scan circuit 12, etc., arranged on the left and right sides of the display area 32 do not overlap signal lines 34 extending in the vertical direction, and a circuit, such as the selector 20 etc., arranged on the lower side of the display area 32 does not overlap signal lines 36 extending in the horizontal direction, signal crosstalk is unlikely caused. However, in comparison between the display panel 30 and a display panel having a rectangular display area having the same horizontal and vertical sizes as those of the display area 32, it is understood that the display panel 30 has a problem in that the display panel 30 is disadvantageous in view of size reduction and narrowing of a frame area as the size of the panel, or the substrate, of the display panel 30 is the same as that of the display panel having the rectangular display area, though the display area of the display panel 30 is smaller.

The present invention aims to reduce the size of a display device having a touch sensor function and a display area in a shape (an irregular shape) different from a rectangular shape.

A display device according to the present invention is a display device having a display area and a touch sensor function in addition to a video display function, including signal lines formed in the display area of a substrate, including a plurality of video lines extending in a first direction and a plurality of scan lines extending in a second direction intersecting the first direction; a plurality of common electrodes formed in the display area so as to extend in the second direction, for being used for video display and touch detection; a video signal transmission line arranged on the substrate along a first edge among edges of a signal line laying area where the video lines and the scan lines are arranged, for transmitting a video signal to one end of two ends of each of the video lines, the one ends being arranged on a side where the video signal transmission line is arranged, the first edge being an edge with which the one ends of the video lines are aligned; and a scan circuit and a common drive circuit arranged on the substrate along a second edge among the edges of the signal line laying area, the second edge being an edge with which ends of the scan lines and the common electrodes are aligned, the scan circuit for applying a scan signal to the scan line, and the common drive circuit for applying a reference potential signal or a touch detection signal to the common electrode, wherein the signal line laying area has a shape including an overlapping part where the first edge overlaps the second edge, and in a part of a frame area positioned outside the signal line laying area on the substrate, the part adjacent to the overlapping part, the scan circuit and the common drive circuit are arranged more outward than the video signal transmission line.

DETAILED DESCRIPTION OF THE INVENTION

Figure 1:
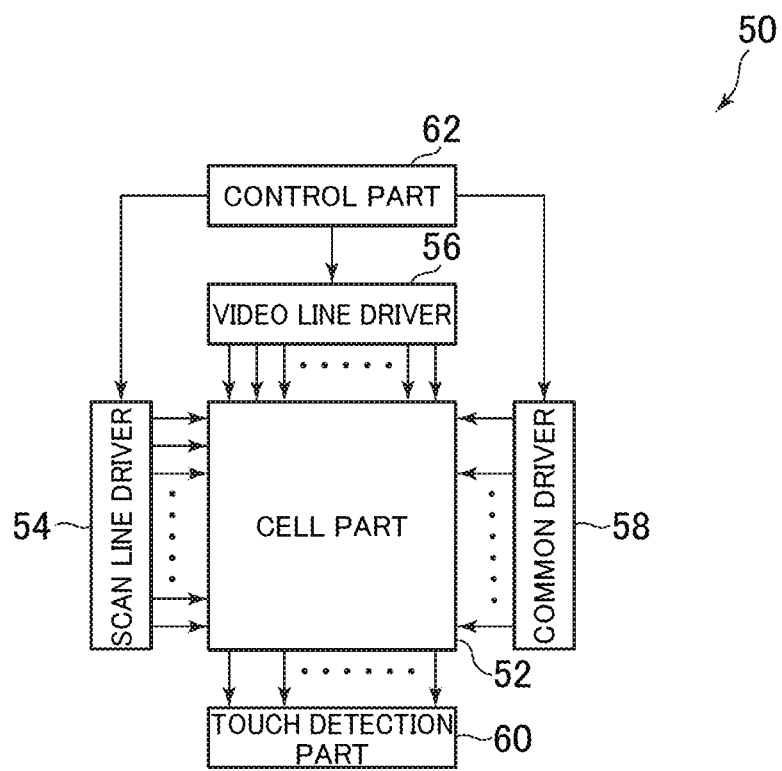
FIG. 1 is a schematic view showing a schematic structure of a display panel according to an embodiment of the present invention.

In the following, embodiments of the present invention (hereinafter referred to as embodiments) will be described based on the drawings.

Note that the disclosure relates merely to one example, and any change readily conceived while retaining the gist of the present invention by a person skilled in the art is naturally included in the scope of the present invention. Further, in the drawings, the width, thickness, shape, etc., of the respective parts may be shown schematically, compared to those according to the actual aspect, for the purpose of making the drawings clearer. The drawings merely show one example and do not limit in any way the interpretation of the present invention. In this specification and respective drawings, an element identical to one described earlier in connection with a drawing referred to earlier is given the same reference numeral, and detailed description thereof may be omitted.

First Embodiment

A display device according to the respective embodiments of the present invention is a touch panel built-in display panel 50 in which a liquid crystal display panel is integrated with an electrostatic capacitance type touch panel. FIG. 1 is a schematic diagram showing a schematic structure of a display panel 50 according to an embodiment. Note that the positions and shapes of the respective parts shown in FIG. 1 do not indicate the layout on a substrate of the display panel 50. The layout will be described later.

The display panel 50 includes a scan line driver 54, a video line driver 56, a common driver 58, a touch detection part 60, and a control part 62, besides a cell part 52 having a touch sensor function and a display function.

The cell part 52 has a structure in which a touch sensor is integrated with a liquid crystal display cell and basically corresponds to the display area of the display panel 50. The cell part 52 includes a device substrate, an opposed substrate positioned so as to oppose to the device substrate, and liquid crystal sandwiched between the device substrate and the opposed substrate.

Figure 2:
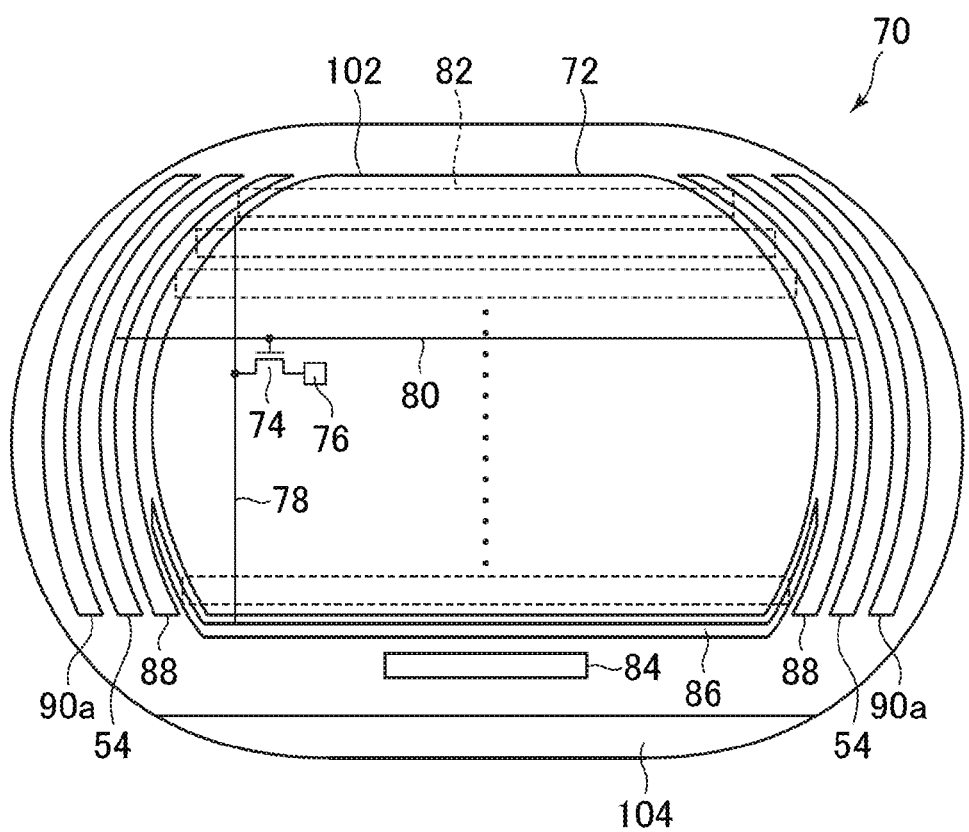
FIG. 2 is a schematic plan view of a device substrate of a display panel according to a first embodiment of the present invention.

FIG. 2 is a schematic plan view showing a device substrate 70 on which thin film transistors (TFTs) of the display panel 50 and signal lines according to the first embodiment are arranged. On the surface of a display area 72 closer to the liquid crystal, a TFT 74 and a pixel electrode 76 are formed in FIG. 2. Specifically, the pixel electrodes 76 and the TFTs 74 are arranged in a matrix so as to correspond to the pixel alignment. Note that being in a matrix refers to the alignment of pixels in a row direction and a column direction orthogonal to each other, but does not means that the shape of the entire area where the pixels are aligned is rectangular.

On the surface of the device substrate 70 closer to the liquid crystal, signal lines extending in the display area 72, namely, a plurality of video lines 78 extending in the pixel column direction and a plurality of scan lines 80 extending in the pixel row direction, are formed. The scan line 80 is provided for every pixel row, and commonly connected to the gate electrodes of the plurality of TFTs 74 in the row. Meanwhile, the video line 78 is provided for every pixel column, and commonly connected to the drains of the plurality of TFTs 74 in the column. Further, to the source of each TFT 74, a pixel electrode 76 corresponding to the TFT is connected.

The TFT 74 provided to each pixel as an active element (a switch element) is an n-channel in this embodiment, and is turned on in units of a row in response to a gate pulse that rises in the positive direction applied from the scan line 80 as a scan signal. The pixel electrode 76 is connected to the video line 78 via the TFT 74 in an on state, and receives a voltage (a pixel voltage) in accordance with the video signal from the video line 78.

In the display area 72 of the device substrate 70, a plurality of common electrodes 82 made of transparent electrode material, such as ITO (Indium-Tin-Oxide) etc., for example, similar to the pixel electrode, are arranged. Each common electrode 82 is an elongated strip electrode that is long in the pixel row direction, and arranged in the display area 72 so as to extend in the pixel row direction. For example, the common electrodes 82 each have such a width that covers the pixels in a plurality of rows, and are aligned in parallel to each other in the pixel column direction to cover the display area 72. The width of the common electrode 82, which differs depending on the resolution of the display panel 50, is generally wide enough to cover the pixels in two to thirty rows.

The common electrode 82 is used as a common electrode for applying common reference potential (common potential) to the respective pixels for the video display function of the display panel 50, and also as a drive electrode for applying a drive signal for the touch sensor function. Specifically, for the video display function, orientation of the liquid crystal is controlled for every pixel by an electric field caused in accordance with a voltage between the pixel electrode and the common electrode, to thereby change the permeability relative to the light incident from the backlight unit. With the above, an image is formed on a display surface.

Meanwhile, for the touch sensor function, the display panel 50 further includes a plurality of detection electrodes. For example, the detection electrode is formed on the opposed surface closer to the display surface which can be touched by an object, such as a finger, etc. The respective detection electrodes are arranged orthogonal to the common electrodes 82, and formed in the pixel column direction in the display area 72. The plurality of detection electrodes are aligned in parallel to each other in the pixel row direction over the entire display area 72.

For the touch sensor function, for example, an AC signal, such as a rectangular pulse, etc., for example, is inputted into the common electrode 82 to detect an electric signal generated in the detection electrode. That is, the common electrode 82 functions as a transmission electrode, while the detection electrode functions as a reception electrode. Change in voltage caused in a detection electrode due to capacitive coupling with the common electrode 82 is different between a position on the display surface touched by an object and a position not touched on the display surface. Therefore, by sequentially selecting the common electrode 82 and applying an AC signal to the common electrode 82 selected, it is possible to specify a pair of the common electrode 82 and a detection electrode corresponding to a position touched.

The scan line driver 54 is a scan circuit having a function of sequentially selecting, based on a control signal supplied from the control part 62, one horizontal line to be driven for display on the display panel 50. For example, the scan line driver 54 has a shift register having the number of stages corresponding to the number of scan lines 80, and the output terminals of the respective stages of the shift register are connected to the respective scan lines 80. Then, upon receipt of a trigger signal from the control part 62, the scan line driver 54 starts operation to sequentially select the scan line 80 according to an order along the vertical scan direction, and outputs a scan signal to the scan line 80 selected. The scan line driver 54 is arranged on the device substrate 70 as shown in FIG. 2.

The video line driver 56 receives a video signal from the control part 62, and, upon selection of a scan line 80 by the scan line driver 54, outputs voltages in accordance with a video signal for the pixel row selected to the respective video lines 78.

Note here that the video line driver 56 can be connected to the video line 78 via a selector. The selector is connected via the input thereof to one video signal transmission line from the video line driver 56 and via the output thereof to the video lines 78 of a plurality of pixel columns, and switches by means of time sharing in response to a control signal from the control part 62 a video line 78 to which to output a video signal inputted from the video signal transmission line. For example, assume that the pixel alignment in the cell part 52 is a stripe alignment including pixels for red (R), green (G), and blue (B) in the embodiment. In this alignment, pixels of the same kind (color) are aligned in the vertical direction of an image, while RGB are cyclically aligned in the horizontal direction. Considering three adjacent pixel columns including an R pixel column, a G pixel column, and a B pixel column as one group, one selector can be provided for every group.

In FIG. 2, the video line driver 56 is built in a driver IC 84, together with the control part 62, and the video signal transmission lines (not shown) extend from the driver IC 84 to the plurality of respective selectors 86.

The common driver 58 is a drive circuit for supplying a reference potential signal and a drive signal for a touch panel to the common electrode 82, based on a control signal supplied from the control part 62. Specifically, the common driver 58 sequentially applies an AC drive signal VCOMAC as a sensor drive signal by means of time sharing to the common electrode 82 to be driven for touch detection, and also a DC drive signal VCOMDC as a reference potential for the video display function to the other common electrodes 82. The common driver 58 includes a switch circuit 88 shown in FIG. 2, for example, and a shift register circuit 90 formed using unit control circuits 90a to be described later.

Figure 3:
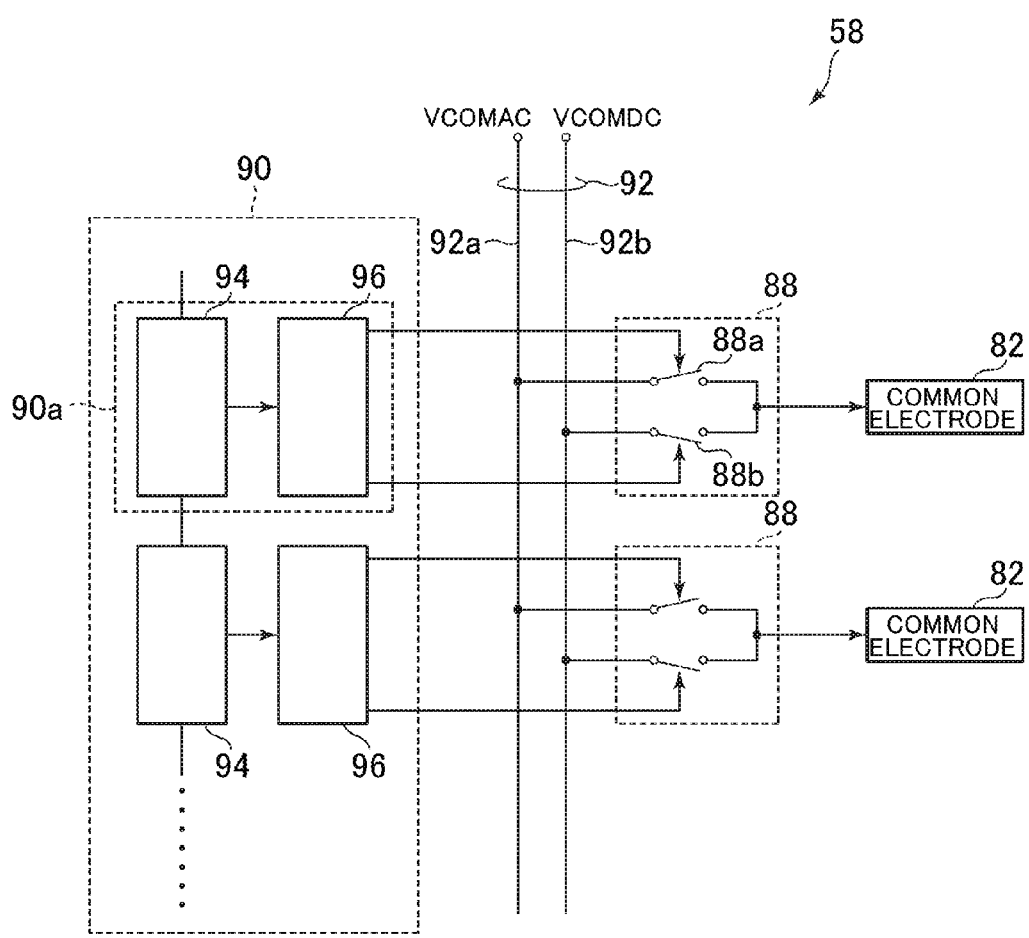
FIG. 3 is a schematic view showing a schematic structure of one example of a common driver.

FIG. 3 is a schematic view showing a schematic structure of one example of the common driver 58. The common driver 58 includes drive signal transmission lines 92 to which drive signals are supplied from the control part 62, in addition to the switch circuits 88 and the shift register circuit 90. The switch circuit 88 is provided corresponding to each common electrode 82 to switch connection between the common electrode 82 and the drive signal transmission lines 92. The shift register circuit 90 controls switching by the switch circuits 88. For example, the shift register circuit 90 has the number of unit circuits 94s corresponding to the number of common electrodes 82, and starts operation upon receipt of a trigger signal from the control part 62 so that the respective unit circuits 94 sequentially output a pulse. A switch drive circuit 96 is provided corresponding to each switch circuit 88, and generates a signal for controlling switching by the switch circuit 88, based on an output of the unit circuit 94. Note that a pair of a unit circuit 94 and a corresponding switch drive circuit 96 will be hereinafter referred to as a unit control circuit 90a.

Specifically, the drive signal transmission line 92 includes a transmission line (a VCOMAC line 92a) to which an AC drive signal VCOMAC is supplied from the control part 62 and a transmission line (a VCOMDC line 92b) to which a DC drive signal VCOMDC is supplied from the control part 62. The switch circuit 88 includes a switch 88a for turning on/off between the VCOMAC line 92a and the common electrode 82, and a switch 88b for turning on/off between the VCOMDC line 92b and the common electrode 82. The switch drive circuit 96 outputs, for example, a signal for turning on the switch 88a and a signal for turning off the switch 88b during a period with a pulse that rises to a High level (H level) potential inputted from the unit circuit 94 and a signal for turning off the switch 88a and a signal for turning on the switch 88b during a period with an output at a Low level (L level) potential inputted from the unit circuit 94.

Note that each switch circuit 88 can include a plurality of pairs of the switches 88a, 88b. That is, as the common electrode 82 has such a large area that covers a plurality of rows, and a transistor constituting the switch 88a, 88b is accordingly required to have a large channel width. This requirement is satisfied by providing a plurality of switches 88a, 88b in parallel, each having relatively small channel width and size. This structure allows the lines connecting the larger number of scan lines 80 than that of the common electrodes 82 and the scan line driver 54 to be laid between the switches 88a, 88b making a pair. This can facilitate laying out.

When the horizontal width of a part of the display area 72 is larger, the length and area of the common electrode 82 corresponding to the part of the display area 72 are larger, with a larger load resulted. In view of the above, the channel width of the switch 88a, 88b and the number of switches 88a, 88b provided in parallel may be accordingly increased.

The touch detection part 60 detects an object approaching and touching the display surface of the cell part 52, based on a detection signal outputted from the detection electrode provided to the cell part 52.

The control part 62 receives a video signal including a synchronizing signal, and generates a video signal indicative of a pixel value to output to the video line driver 56. Further, the control part 62 generates a control signal for having respective parts, including the scan line driver 54, the video line driver 56, the common driver 58, and the touch detection part 60, etc., to be synchronized, and outputs to these parts.

With the above described structure, the display panel 50 executes a touch detection operation, while executing a display operation.

Figure 4:
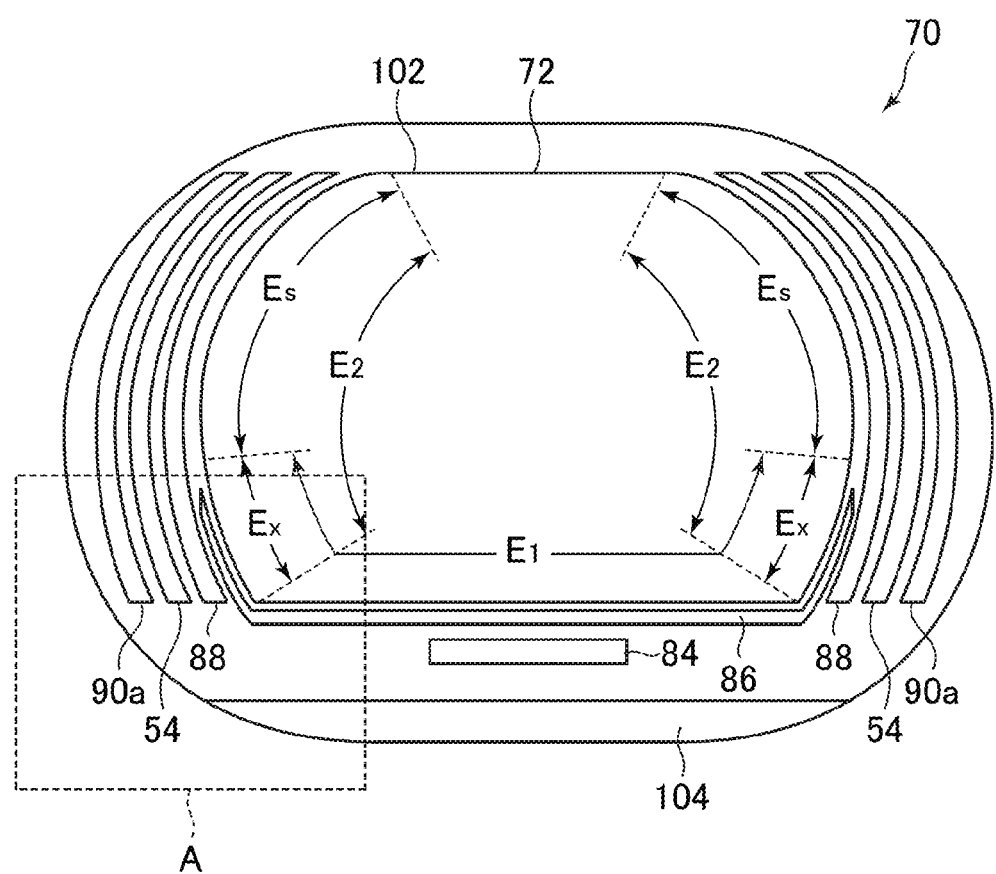
FIG. 4 is a schematic plan view showing a layout of a frame area of a device substrate of the display panel according to the first embodiment of the present invention.

Below, a layout of the device substrate 70 will be described. The display panel 50 has the display area 72 having an irregular shape, that is, not rectangular. FIG. 4 is a simpler version of FIG. 2, with a structure inside the display area 72 not shown. In FIG. 4 (or FIG. 2), the display area 72 having a barrel shape whose upper and lower edges are straight lines extending in the horizontal direction and left and right edges that connect the upper and lower straight edges each have an arc shape that is convex outward is shown as an example. The present invention aims to implement a narrower frame area of the device substrate 70 with respect to the display area 72 having an irregular shape to thereby reduce the size of the display panel 50. As a result of a narrower frame area, the device substrate 70 has a shape not rectangular but a shape similar to that of the display area 72, as shown in FIG. 2. The narrower frame area and size reduction is achieved by changing a layout of the circuits and lines arranged in the frame area.

Note here that the circuits and lines in the frame area are arranged basically outside the laying area (a signal line laying area) of the video line 78 and the scan line 80 laid in the cell part 52. In view of the above, positioning the ends of the video lines 78 and the scan lines 80 formed in the display area 72 so as to be basically aligned with the respective edges of the display area 72 contributes to a narrower frame area. This is similarly applied to the common electrode 82. That is, the ends of the common electrodes 82 are positioned basically aligned with an edge of the display area 72.

Figure 5:
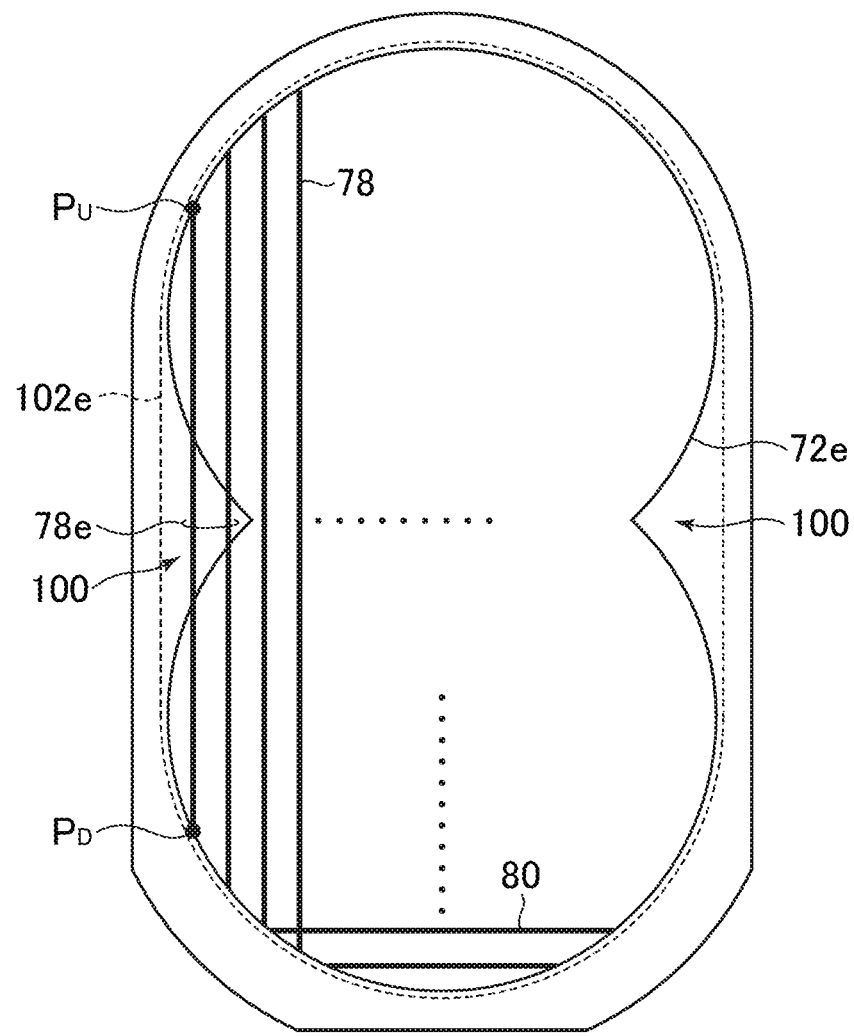
FIG. 5 is a schematic plan view of a device substrate, showing an example in which a display area does not coincide with a signal line laying area.

With the video line 78 and the scan line 80 extending from one end to the other end of the display area 72, in a case such as is shown in FIGS. 2 and 4, a signal line laying area 102 where the video line 78 and the scan line 80 are arranged is basically shaped similar to the display area 72. However, in the case where a display area 72e has a valley portion 100, such as is shown in FIG. 5, the shape of a signal line laying area 102e may not coincide with that of the display area 72e. This is because, in the example shown in FIG. 5, the valley portion 100 as well is included in the signal line laying area 102e as the video line 78e is formed between the upper end $P_u$ and the lower end $P_D$ of the display area 72 at the horizontal position where the video line extends. In conclusion, the shape of the signal line laying area may not always coincide with that of the display area 72, but can have a larger area than the display area 72, though the signal line laying area is basically defined coincident with the display area 72 for the purpose of implementing a narrower frame area.

Note here that the position of a circuit etc., in the frame area is expressed in correlation with a position along an edge of the signal line laying area 102. Assume that, as shown in FIG. 4, a part of the edges of the signal line laying area 102 with which the lower ends of the video lines 78 are aligned is referred to as a first edge $E_1$, and another part of the same with which the ends of the scan lines 80 and the common electrodes 82 are aligned is referred to as a second edge $E_2$. The display area 72 has a shape including a part where the first edge $E_1$ overlaps the second edge $E_2$. This overlapping part is referred to as an overlapping edge $E_x$, and a part of the second edge $E_2$ excluding the overlapping edge $E_x$ is referred to as a non-overlapping edge $E_s$.

Figure 6:
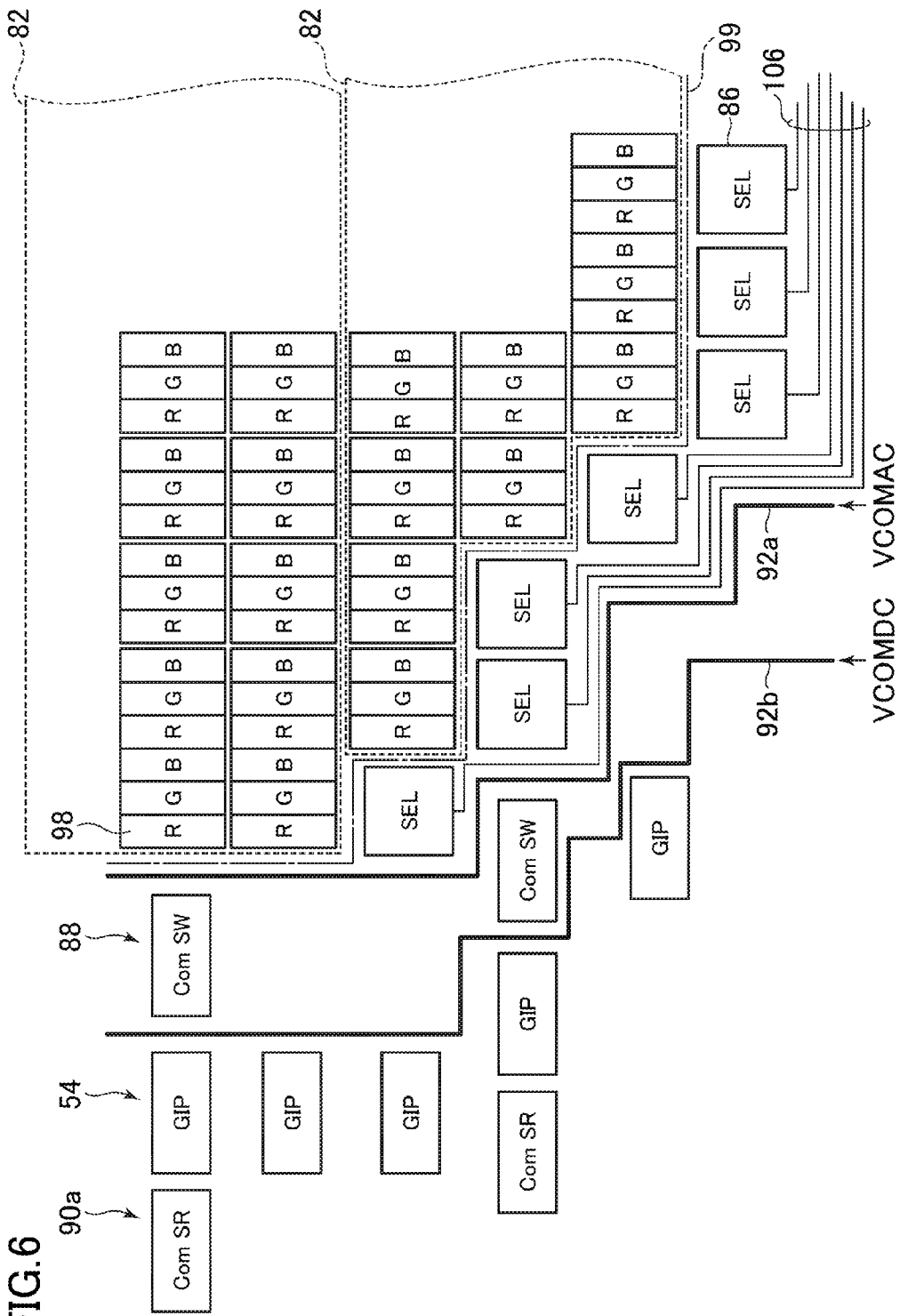
FIG. 6 is a schematic plan view showing a layout of a frame area in a lower left part of a device substrate.

The driver IC 84 is arranged in the frame area along the first edge $E_1$, that is, in the frame area on the lower side of the display area 72 of the device substrate 70 shown in FIG. 4. Note that a terminal is arranged in a terminal area 104 ensured in the lower end portion of the device substrate 70, and the driver IC 84 is connected to an external circuit via the terminal. A group of video signal transmission lines 106 for sending a video signal from the video line driver 56 built in the driver IC 84 to the video lines 78 are laid in an area along the first edge $E_1$, as shown in FIG. 6 to be described later. In particular, the video signal transmission line 106 directed to the video line 78 positioned apart from the driver IC 84 in the horizontal direction extends along the first edge $E_1$.

In this embodiment, the video signal transmission line 106 is connected to three video lines 78 corresponding to the R pixel column, the G pixel column, and the B pixel column, respectively, via the selector 86. As shown in FIG. 6, each selector 86 is arranged in a position close to the lower ends of the three video lines 78 to which the selector 86 is connected, and the video signal transmission line 106 is connected to the selector 86. Thus, the selector 86 is aligned between the video signal transmission line 106 and the signal line laying area 102 along the first edge $E_1$ with which the lower ends of the video lines 78 are aligned.

While the first edge $E_1$ has a non-linear shape, arranging the selector 86 and the video signal transmission line 106 along the non-linear shaped first edge $E_1$ can implement a narrower frame area.

The scan line driver 54 and the common driver 58 are arranged on the device substrate 70 along the second edge $E_2$. Specifically, in the example shown in FIG. 4, sequentially from the side of the signal line laying area 102 toward the edge of the device substrate 70, the switch circuit 88, the scan line driver 54, the shift register circuit 90 (the unit control circuit 90a) are arranged along the second edge $E_2$. Alternatively, this order may be from the switch circuit 88, the shift register circuit 90, to the scan line driver 54.

While the second edge $E_2$ has a non-linear shape, arranging the scan line driver 54 etc., along the non-linear shaped second edge $E_2$ can implement a narrower frame area.

Specifically, as shown in FIG. 6, the scan line driver 54 is arranged such that the respective stages of the shift register thereof are aligned along the second edge $E_2$. Also, as the common driver 58, the unit control circuit 90a of the shift register circuit 90 and the switch circuit 88 are provided for every common electrode 82, and these circuits 90a, 88, provided for every common electrode 82, are arranged along the second edge $E_2$, as shown in FIG. 6. With the above, the non-straight layout of the scan line driver 54, the switch circuit 88, and the shift register circuit 90 (the unit control circuit 90a) shown in FIG. 4 is achieved.

Note that in order to reduce influence of deteriorated pulse in the scan line 80 and the common electrode 82, the scan line driver 54 and the common driver 58 (the unit control circuit 90a and the switch circuit 88) are arranged on each of the left and right sides of the display area 72 to supply a signal from the respective both ends of each of the scan line 80 and the common electrode 82. For example, basically, a symmetrical circuit layout can be implemented for the frame area on the left and right respective sides of the display area 72.

This, however, may not be applicable to a display panel having a display area 72 in a smaller size, and the scan line driver 54 and the common driver 58 (the unit control circuit 90a and the switch circuit 88) may be arranged only on one side of the display area 72.

Note here that the display area 72 has a shape that includes the overlapping edge $E_x$ between the first edge $E_1$ and the second edge $E_2$ of the signal line laying area 102, as described above. In a part of the frame area adjacent to the overlapping edge $E_x$, the scan line driver 54 and the common driver 58 are positioned more outward than the video signal transmission line 106. In this embodiment, as the selector 86 is arranged between the video signal transmission line 106 and the signal line laying area 102, the selector 86, the video signal transmission line 106, the switch circuit 88, the scan line driver 54, and the unit control circuit 90a are arranged in the frame area along the overlapping edge $E_x$, sequentially from the side of the signal line laying area 102 toward the edge of the device substrate 70.

Where each of the scan line driver 54 and the common driver 58 includes a shift register and uses a clock signal for the operation of each of the shift registers, positioning the above described video signal transmission line 106 so as to be closer to the signal line laying area 102 than the scan line driver 54 and the common driver 58 can prevent crosstalk from the clock signal line to the video signal as the line for transmitting a video signal does not intersect the clock signal lines of the scan line driver 54 and the common driver 58.

FIG. 6 is a schematic view showing in detail a layout of the circuits etc., in the frame area, being specifically a schematic plan view showing enlarged a lower left part of the device substrate 70 (the part enclosed by the frame line A in FIG. 4). In FIG. 6, the edge 99 of the signal line laying area 102 is indicated by the alternate long and short dash line surrounding the display area 72 where the pixels 98 are aligned. FIG. 6 further shows an example of arrangement of the scan line driver 54 and the common driver 58 in a range corresponding to five pixel rows from the bottom along the second edge $E_2$ on the left side of the signal line laying area 102, and an example of arrangement of seven leftmost selectors 86 among those arranged along the first edge $E_1$. In FIG. 6, a block "SEL" indicates the selector 86, in which four leftmost selectors 86 are arranged in a part (the overlapping edge $E_x$) where the first edge $E_1$ overlaps the second edge $E_2$; a block "GIP" indicates the scan line driver 54, basically corresponding to a circuit for one stage of a shift register of the scan line driver 54; a block "ComSR" indicates the unit control circuit 90a, or a circuit for one stage of a shift register of the shift register circuit 90; and a "ComSW" indicates the switch circuit 88.

Note that although the common electrode 82 having a width covering three pixels is shown as an example for convenience in FIG. 6, generally, the common electrode 82 is formed having a width corresponding to two to thirty rows, as described above. "ComSR" and "ComSW" are provided corresponding to the common electrode 82 as shown in FIG. 6.

The VCOMAC line 92a and the VCOMDC line 92b are arranged extending from the control part 62, or a drive signal source, along the first edge $E_1$ to the end of the second edge $E_2$, and, along the second edge $E_2$, can be arranged on the respective sides of the switch circuit 88, as shown in FIG. 6. Note that although the VCOMAC line 92a is positioned on the side of the video signal transmission line 106 relative to the switch circuit 88 and the VCOMDC line 92b on the side of the scan line driver 54 relative to the switch circuit 88 in FIG. 6, the VCOMAC line 92a and the VCOMDC line 92b may be positioned opposite from the above.

Figure 7:
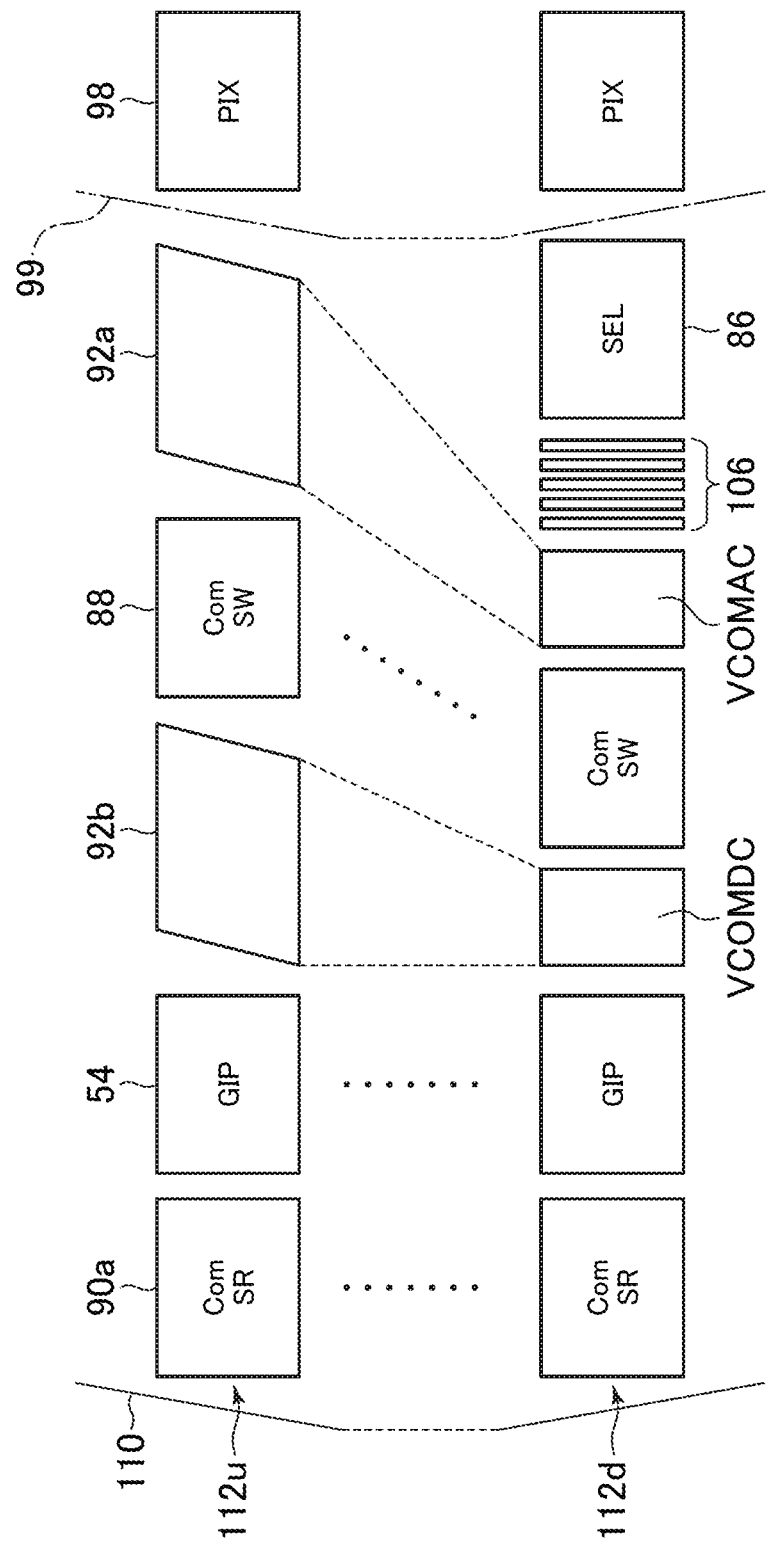
FIG. 7 is a schematic plan view showing a circuit layout in a lower left part of a display panel.

FIG. 7 is a schematic view explaining a difference in a circuit layout in the frame area along the second edge $E_2$ between an area along the overlapping edge $E_x$ and an area along the non-overlapping edge $E_s$. Specifically, FIG. 7 shows a part of the left side frame area of the device substrate 70, with the signal line laying area 102 existing on the right side and the left edge 110 of the device substrate 70 existing on the left side. The layout 112u shows an arrangement of the circuits etc., in the frame range along the non-overlapping edge $E_s$, while the layout 112d shows an arrangement of the circuits etc., in the frame area along the overlapping edge $E_x$. Along the second edge $E_2$, the line driver 54 and the common driver 58 are arranged along both of the non-overlapping edge $E_s$ and the overlapping edge $E_x$. For example, in the layouts 112u, 112d shown in FIG. 7, the VCOMAC line 92a, the switch circuit 88, the VCOMDC line 92b, the scan line driver 54, and the unit control circuit 90a are sequentially arranged from the side of the signal line laying area 102 toward the edge of the device substrate 70. Further, along the overlapping edge $E_x$, the selector 86 and the video signal transmission line 106 are additionally arranged between the scan line driver 54 and the common driver 58 and the single line laying area 102, as described above. Specifically, in the layout 112d, the selector 86 and the video signal transmission line 106 exist between the VCOMAC line 92a and the signal line laying area 102.

Therefore, along the non-overlapping edge $E_s$, there is room in the frame area due to absence of the selector 86 and the video signal transmission line 106, and it is possible to reduce the width of the frame area along the non-overlapping edge $E_s$ by an amount corresponding to the room. In this embodiment, however, the width of the VCOMAC line 92a and the VCOMDC line 92b along the non-overlapping edge $E_s$ is made wider than that along the overlapping edge $E_x$ by the amount corresponding to the room to thereby reduce the resistance of the VCOMAC line 92a and the VCOMDC line 92b. This enables preferable transmission of a drive signal to the drive signal transmission line 92 along the non-overlapping edge $E_s$, to which the drive signal has traveled by a longer distance from the control part 62. With the above, it is possible to reduce a difference in a drive signal applied to the common electrode 82 among the common electrodes 82.

Employment of a multi-layer line structure for the VCOMDC line 92b and the scan line driver 54 allows the VCOMDC line 92b and the scan line driver 54 to be arranged including overlap. This can further narrow the frame area.

Figure 13:
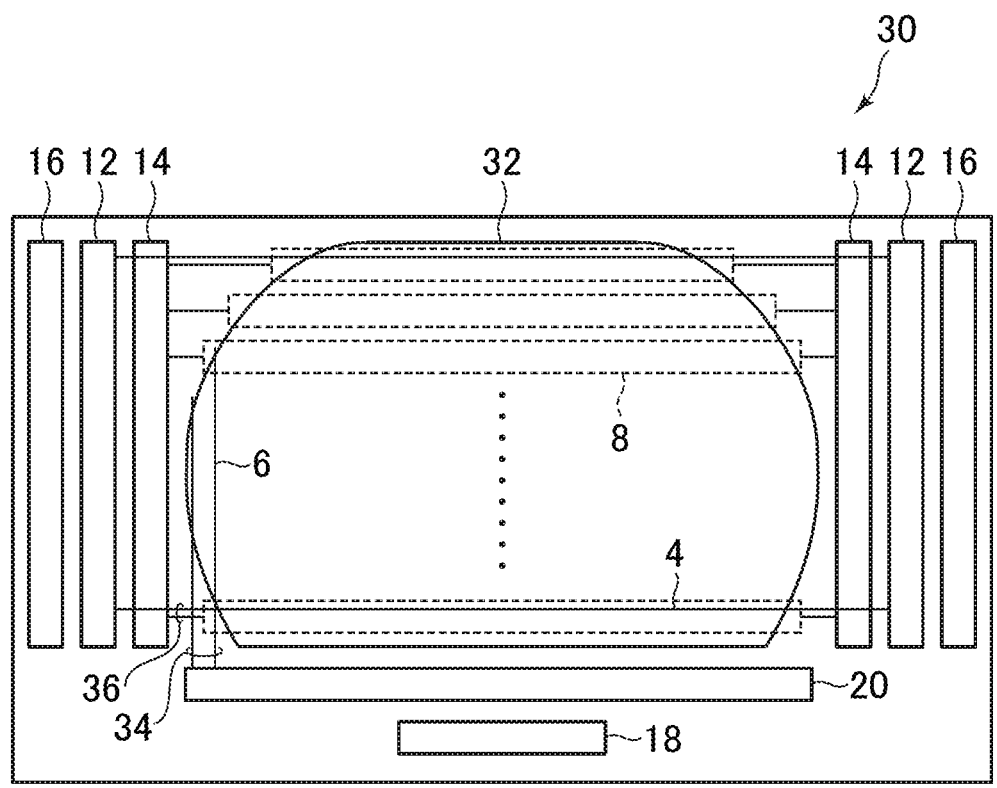
FIG. 13 is a schematic view showing a conventional layout of an in-cell type display panel having a display area not rectangular.

In the case where the signal line laying area 102 has a shape that is convex in the horizontal direction on the second edge thereof, like the display area 72 having a barrel shape according to this embodiment, use of a rectangular substrate as shown in FIG. 13 results in a problem in that, although the distance between the second edge of the signal line laying area and the edge of the substrate, that is, the width of the frame area, can be made shorter at the protruding end of the convex portion of the signal line laying area, the distance becomes longer as it goes closer to a corner of the rectangular substrate. On the contrary, according to the layout of a circuit etc., on the left and right respective sides of the signal line laying area 102 according to the above described embodiment, it is not necessary to employ a rectangular substrate, and it is possible to employ a device substrate having a shape that is convex in the horizontal direction, similar to that of the signal line laying area 102. For example, the device substrate 70 can have a shape in which the distance between any point on the second edge $E_2$ and the edge of the substrate is equal to or shorter than the corresponding distance at the protruding end of the second edge $E_2$ in the horizontal direction.

Second Embodiment

A display panel 50 according to a second embodiment of the present invention will be described mainly referring to a difference from the above described first embodiment. The display panel 50 includes a display area 72 and a device substrate 70 both having an irregular shape, similar to the first embodiment.

Figure 8:
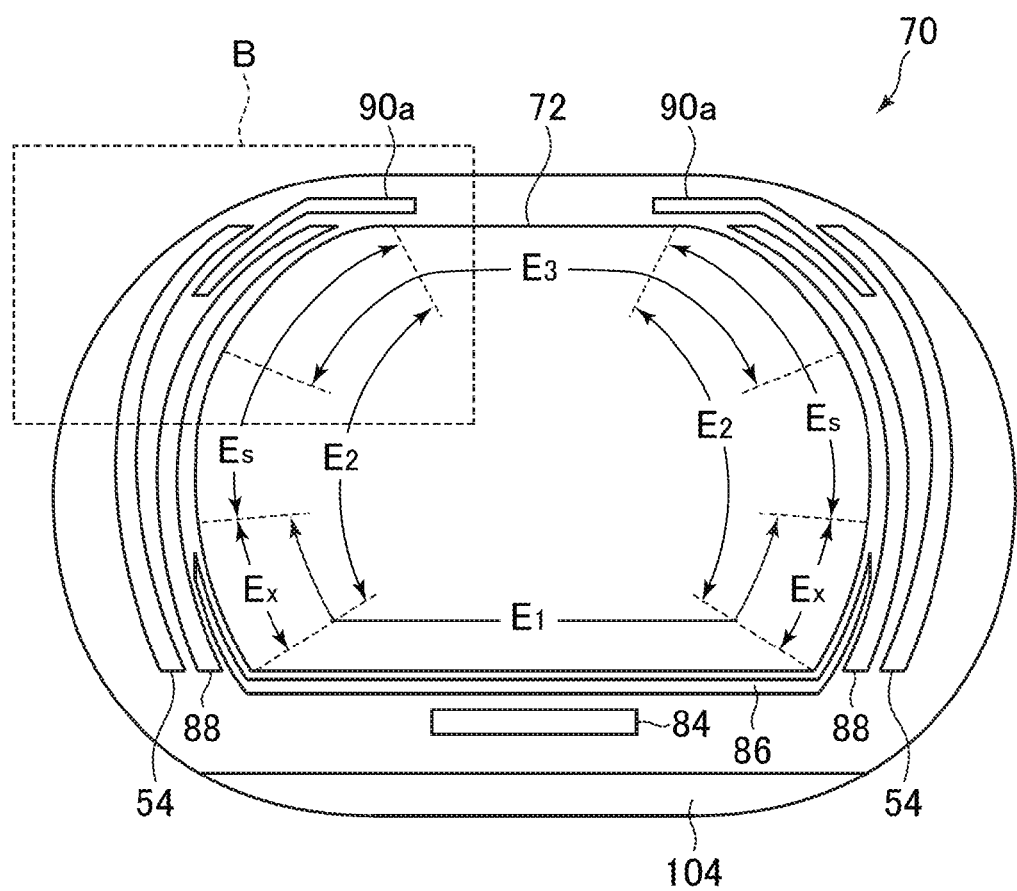
FIG. 8 is a schematic plan view of a device substrate of a display panel according to a second embodiment of the present invention.

FIG. 8 is a schematic plan view showing the device substrate 70 of the display panel 50 according to the second embodiment, with a structure inside the display area 72 not shown, similar to FIG. 4. In the frame area of the device substrate 70, sequentially from the side of the signal line laying area 102 toward the edge of the device substrate 70, the switch circuit 88 and the scan line driver 54 are arranged basically along the entire second edge $E_2$. Note that, although not shown in FIG. 8, the VCOMDC line 92a and the VCOMDC line 92b are arranged on the respective sides of the switch circuit 88, as shown in FIGS. 6 and 7 in the first embodiment.

Meanwhile, the unit control circuit 90a of the shift register circuit 90 is arranged in the frame area in a remote part that is a part of the non-overlapping edge $E_s$ of the second edge $E_2$ and includes the end portion of the non-overlapping edge $E_s$ farther from the first edge $E_1$ or in the frame area along a third edge $E_3$ among the edges of the signal line laying area 102, with which the upper ends of the video lines 78 are aligned. That is, as there is room available in the upper left, upper right, and upper side parts of the device substrate 70, different from the lower left, lower right, and lower side parts thereof, due to absence of the selector 86 and the video signal transmission line 106, the respective circuits of the shift register circuit 90 are collectively arranged in these parts.

Figure 9:
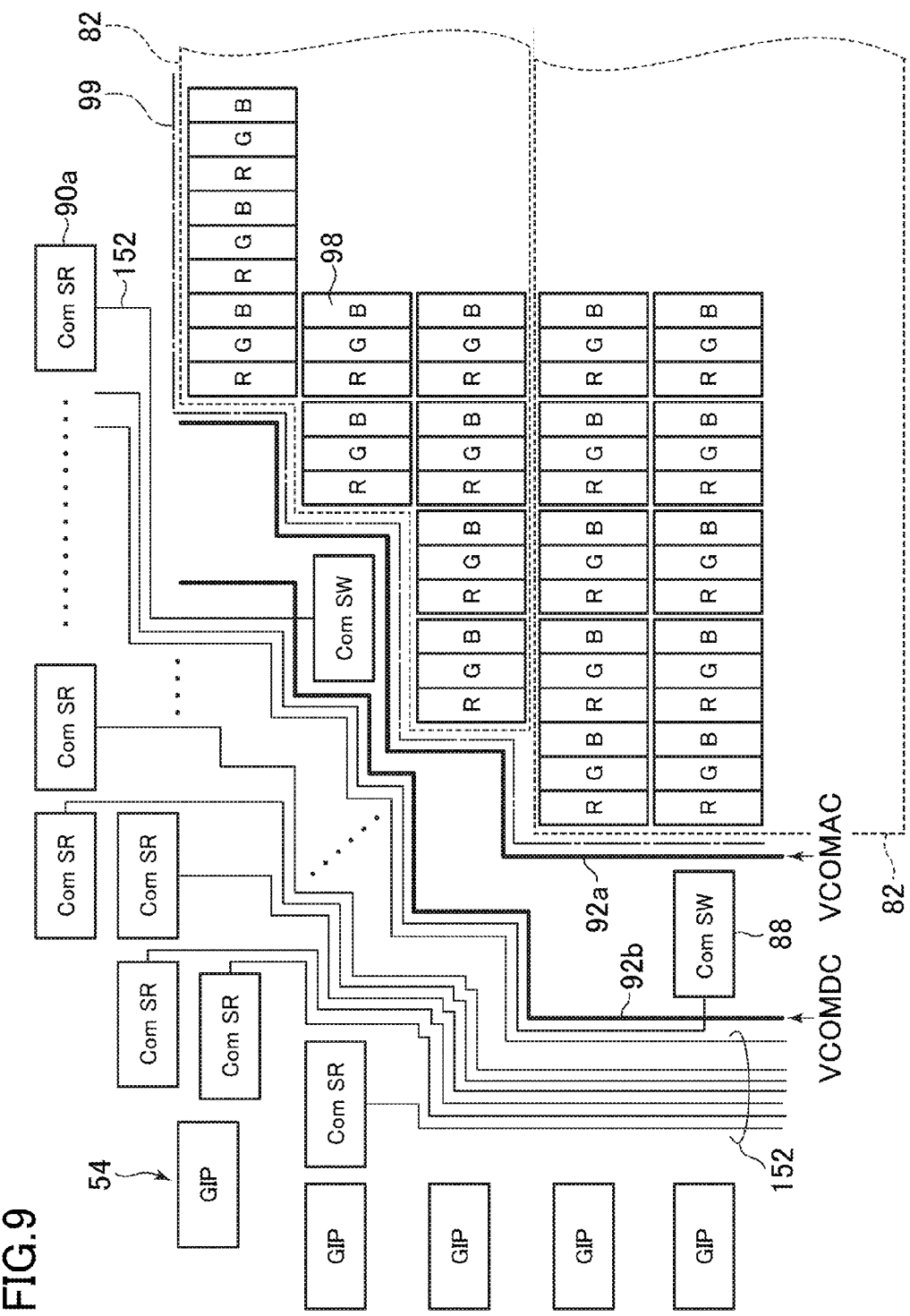
FIG. 9 is a schematic view showing a layout in an upper left part of the device substrate according to the second embodiment of the present invention.

FIG. 9 is a schematic view showing a layout of the shift register circuit 90, the switch circuit 88, and the switch control line 152, specifically showing a layout in the upper left part (the part enclosed by the frame line B) of the device substrate 70 shown in FIG. 8. Although the unit control circuit 90a of the shift register circuit 90 corresponding to each switch circuit 88 is arranged adjacent to the switch circuit 88 in the first embodiment, the unit control circuit 90a is positioned relatively apart from the corresponding switch circuit 88, and a switch control line 152 for transmitting a switch control signal from the unit control circuit 90a to the switch circuit 88 is arranged extending along the second edge $E_2$ in this embodiment. Specifically, the switch control line 152 extends, for example, between the switch circuit 88 and the drive signal transmission line 92 and the scan line driver 54.

Third Embodiment

A display panel 50 according to a third embodiment of the present invention will be described mainly referring to a difference from the above described first embodiment. The display panel 50 includes a display area 72 and a device substrate 70 both having an irregular shape, similar to the first embodiment.

Figure 10:
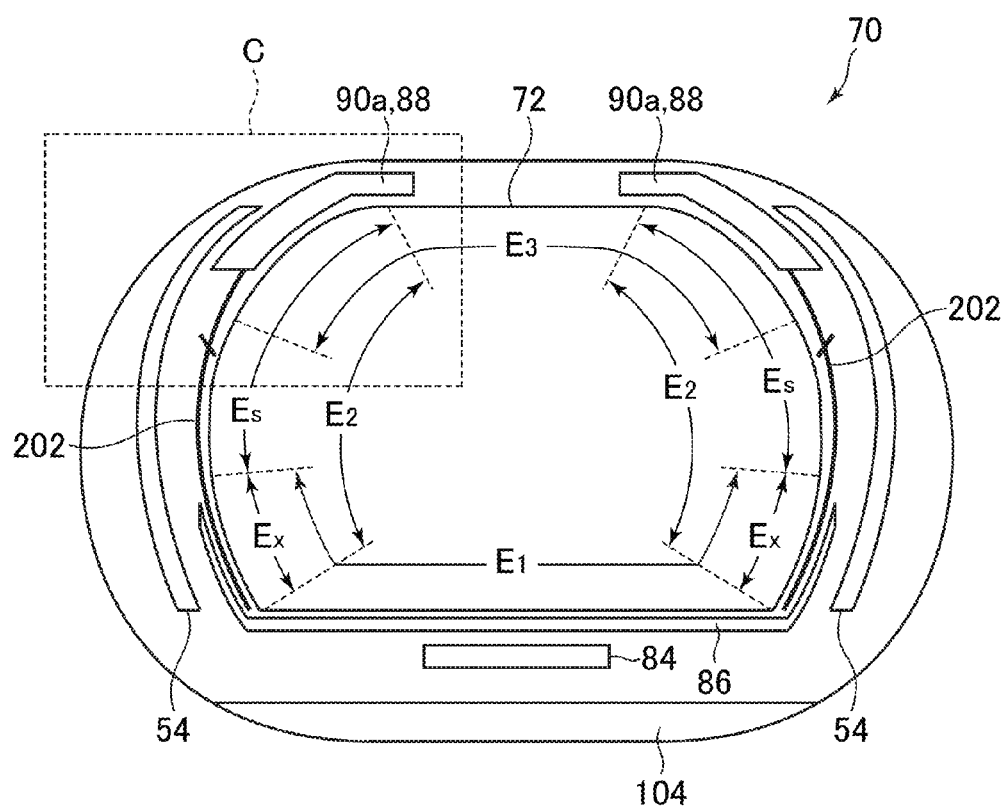
FIG. 10 is a schematic plan view of a device substrate of a display panel according to a third embodiment of the present invention.

FIG. 10 is a schematic plan view showing the device substrate 70 of the display panel 50 according to the third embodiment, with a structure inside the display area 72 not shown, similar to FIG. 4. In the frame area of the device substrate 70, sequentially from the side of the signal line laying area 102 toward the edge of the device substrate 70, a drive signal distribution line 202, a drive signal transmission line 92, and a scan line driver 54 are arranged basically along the entire second edge $E_2$.

Meanwhile, the switch circuit 88 and the unit control circuit 90a of the shift register circuit 90 are arranged in a frame area in a remote part that is a part of the non-overlapping edge $E_s$ of the second edge $E_2$ and includes the end portion of the non-overlapping edge $E_s$ farther from the first edge $E_1$ or in the frame area along the third edge $E_3$ among the edges of the signal line laying area 102, with which the upper ends of the video lines 78 are aligned. That is, as there is room available in the upper left, upper right, and upper side parts of the device substrate 70, different from the lower left, lower right, and lower side parts thereof due to absence of the selector 86 and the video signal transmission line 106, the respective circuits of the switch circuit 88 and the shift register circuit 90 are collectively arranged in these parts.

Figure 11:
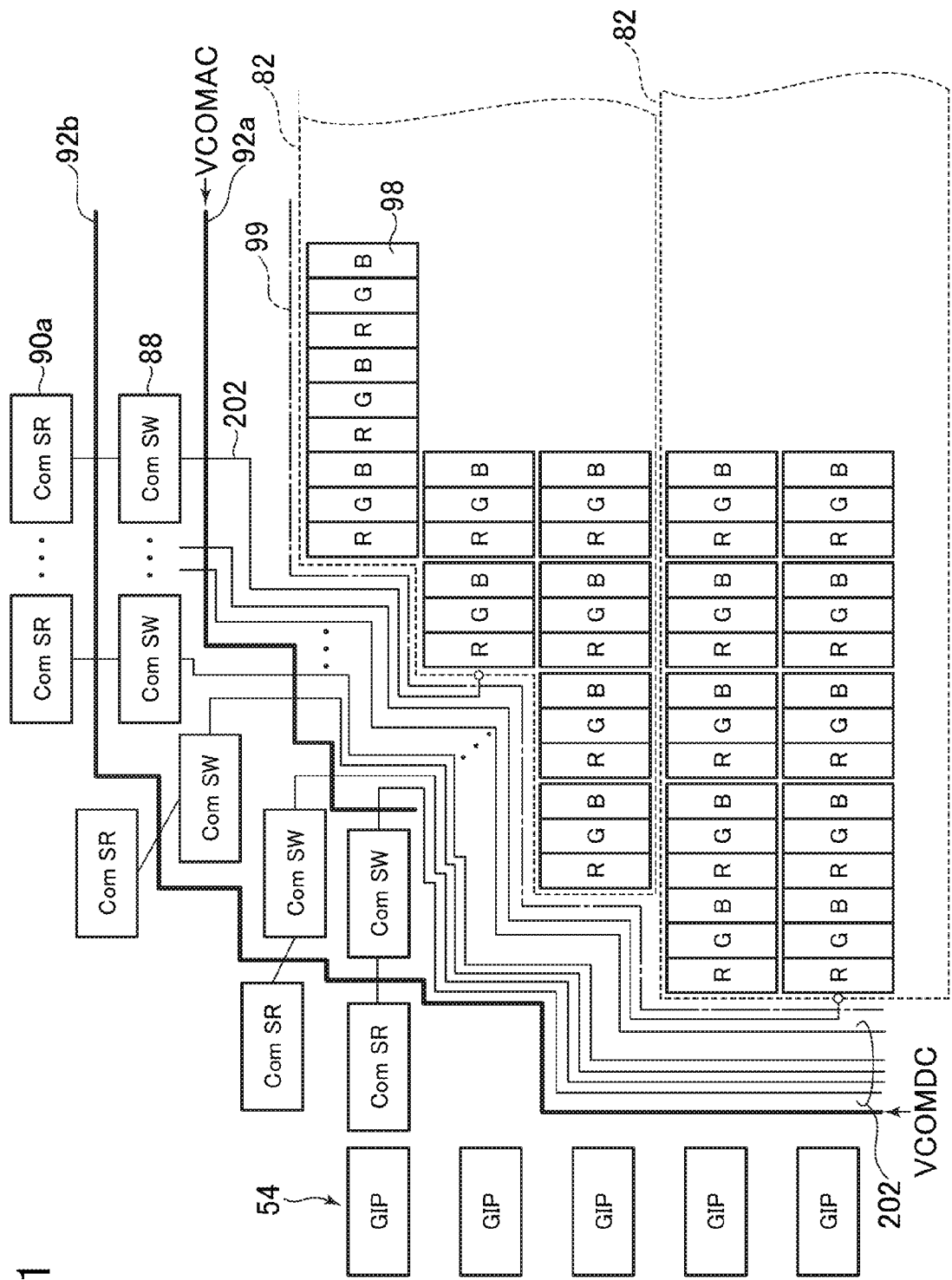
FIG. 11 is a schematic view showing a layout in an upper left part of the device substrate according to the third embodiment of the present invention.
Figure 12:
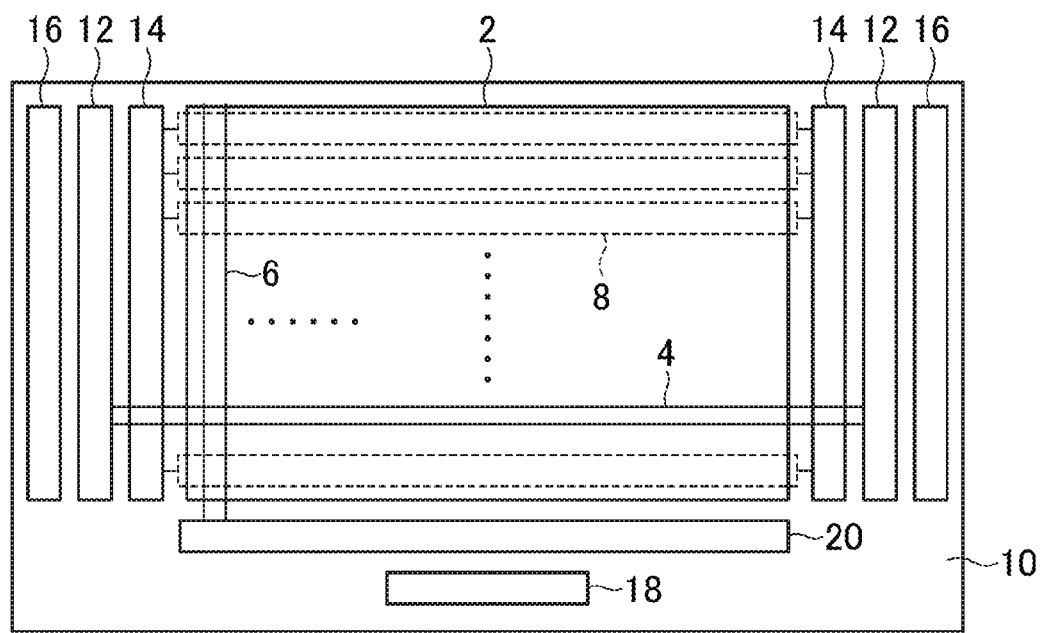
FIG. 12 is a schematic view showing a layout of a conventional in-cell type display panel.

FIG. 11 is a schematic view showing a layout of the shift register circuit 90, the switch circuit 88, and the drive signal distribution line 202, specifically showing a layout in the upper left part (the part enclosed by the frame line C) of the device substrate 70 shown in FIG. 10. Although the switch circuit 88 and the unit control circuit 90a of the shift register circuit 90 corresponding to each common electrode 82 are arranged adjacent to an end of the common electrode 82 in the first embodiment, the switch circuit 88 and the unit control circuit 90a are positioned relatively apart from the corresponding common electrode 82 in this embodiment. A plurality of switch circuits 88 are concentrically arranged on the upper part of the device substrate 70, and the drive signal distribution line 202 for transmitting a drive signal from the switch circuit 88 to each common electrode 82 is arranged extending along the second edge $E_2$. Although not shown in FIG. 11, the drive signal distribution line 202 is arranged in a position closer to the signal line laying area 102 than the video signal transmission line 106 along the overlapping edge $E_x$.

The drive signal transmission line 92 extends between the scan line driver 54 and the video signal transmission line 106 in an area along the overlapping edge $E_x$, and between the scan line driver 54 and the drive signal distribution line 202 in an area along the non-overlapping edge $E_s$, to supply a drive signal from the control part 62 to the switch circuit 88 arranged in the upper part of the device substrate 70. The VCOMAC line 92a and the VCOMDC line 92b, or the drive signal transmission lines 92, can be both arranged along one second edge $E_2$ of the signal line laying area 102. Alternatively, the VCOMAC line 92a and the VCOMDC line 92b can be arranged via different routes to reach the upper part of the device substrate 70, like, for example, the VCOMAC line 92a arranged along the second edge $E_2$ on the right side of the signal line laying area 102 and the VCOMDC line 92b arranged along the second edge $E_2$ on the left side of the same. In this case, the VCOMDC line 92b arranged on the left side extends in the frame area in the upper part of the device substrate 70 to be connected to the switch circuit 88 arranged in the upper right part, while the VCOMAC line 92a arranged on the right side extends in the frame area in the upper part of the device substrate 70 to be connected to the switch circuit 88 arranged in the upper left part. FIG. 11 shows arrangement of the drive signal transmission line 92 in an upper left part of the device substrate 70 in this case.

Although a structure in which the common electrode 82 is used as a common electrode for applying a reference potential for the video display function and also as a drive electrode for applying a drive signal for the touch sensor function has been described in the above described respective embodiments, the present invention can be applied to a structure in which a common electrode and a drive electrode are independently provided.

Also, although the display area 72 having a barrel shape whose upper and lower edges are straight is described as an example in the above described respective embodiments, the entire shape of the display area 72 may be round, and the concept of the circuit layout of the present invention can be similarly applicable.

Although an example in which a display device is a liquid crystal display panel has been described in the respective embodiments described above, other types of display panel may be similarly applicable. For example, an organic electroluminescence (EL) display device may be applicable. An organic EL display device has a lower electrode and an upper electrode for applying a voltage to an organic light emitting layer. For example, the lower electrode is formed for every pixel, and the upper electrode is formed as a common electrode. The common electrode can be used also as a drive electrode of a touch sensor.

In the above, embodiments of the present invention have been described. Note here that it is understood that a person skilled in the art can conceive various examples of changes and modifications within the scope of the concept of the present invention, and that those examples of changes and modifications as well are included in the scope of the present invention. For example, any addition, deletion, or design change of a structural component, addition or omission of a step, or change in condition that is desirably made by a person skilled in the art relative to the above described respective embodiments as well is included in the present invention as long as those include the gist of the present invention.

It is naturally understood that any effect obvious from the description of this specification or desirably conceivable by a person skilled in the art among other effects achieved according to the aspects described in connection with the embodiments is achieved according to the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device having a display area and a touch sensor, comprising:
   signal lines formed in the display area of a substrate, including a plurality of video lines extending in a first direction and a plurality of scan lines extending in a second direction intersecting the first direction;
   a plurality of common electrodes formed in the display area so as to extend in the second direction, for being used for video display and touch detection;
   a video signal transmission line arranged on the substrate along a first edge among edges of a signal line laying area where the video lines and the scan lines are arranged, for transmitting a video signal to one end of two ends of each of the video lines, the one ends being arranged on a side where the video signal transmission line is arranged, the first edge being an edge with which the one ends of the video lines are aligned; and
   a scan circuit and a common drive circuit arranged on the substrate along a second edge among the edges of the signal line laying area, the second edge being an edge with which ends of the scan lines and the common electrodes are aligned, the scan circuit for applying a scan signal to the scan line, and the common drive circuit for applying a reference potential signal or a touch detection signal to the common electrode,
   wherein
   the signal line laying area has a shape including an overlapping part where the first edge overlaps the second edge, and
   in a part of a frame area positioned outside the signal line laying area on the substrate, the part adjacent to the overlapping part, the scan circuit and the common drive circuit are arranged more outward than the video signal transmission line.

2. The display device according to claim 1, wherein
   the video signal transmission line is provided for every group obtained by divining the plurality of video lines into groups each including a plurality of adjacent video lines, and
   the display device further comprises a selector that is a circuit arranged between the video signal transmission line and the first edge, and connected, for every group, via an input thereof to the video signal transmission line, and via an output thereof to the video lines of the group.

3. The display device according to claim 1, further comprising a drive signal source arranged in a part of the frame area, the part adjacent to the first edge, for outputting a signal to be applied to the common electrode,
   wherein
   the common drive circuit includes
      lines extending along the second edge, to each of which a signal is supplied from the drive signal source, including a first drive signal transmission line to which the touch detection signal is supplied and a second drive signal transmission line to which the reference potential signal is supplied, and
      a switch circuit and a switch control circuit for connecting each of the plurality of common electrodes to any of the drive signal transmission lines, and a width of a part of the drive signal transmission line, the part extending in a non-overlapping part of the second edge excluding the overlapping part, is thicker than that in the overlapping part.

4. The display device according to claim 1, wherein the common drive circuit includes
- lines extending along the second edge, including a first drive signal transmission line to which the touch detection signal is supplied and a second drive signal transmission line to which the reference potential signal is supplied,
- a plurality of switch circuits provided each corresponding to each of the plurality of common electrodes and arranged along the second edge so as to correspond to positions in the first direction of the plurality of common electrodes, for switching connection between the each common electrode and the drive signal transmission line,
- a switch control circuit arranged in the frame area in a remote part that is a part of a non-overlapping part of the second edge excluding the overlapping part and includes an end portion of the non-overlapping part farther from the first edge or in the frame area along a third edge among edges of the signal line laying area, with which other ends of the video lines are aligned, for controlling switching by the switch circuit, and
- a switch control line extending from the switch control circuit to the each switch circuit along the second edge.

5. The display device according to claim 1, wherein the common drive circuit includes
- lines extending along the second edge, including a first drive signal transmission line to which the touch detection signal is supplied and a second drive signal transmission line to which the reference potential signal is supplied,
- a plurality of switch circuits provided each corresponding to each of the plurality of common electrodes and arranged in the frame area in a remote part that is a part of a non-overlapping part of the second edge excluding the overlapping part and includes an end portion of the non-overlapping part farther from the first edge or in the frame area along a third edge among edges of the signal line laying area, with which other ends of the video lines are aligned, for switching connection between the each common electrode and the drive signal transmission line,
- a switch control circuit arranged in the frame area in the remote part or in the frame area along the third edge, for controlling switching by the switch circuit, and
- a drive signal distribution line extending from the switch circuit to the each common electrode along the second edge, for transmitting the drive signal outputted from the switch circuit, and
- the drive signal distribution line is arranged closer to the signal line laying area than the video signal transmission line in the overlapping part.

6. The display device according to claim 3, wherein
- the second drive signal transmission line is arranged so as to overlap the scan circuit,
- the switch circuit and the first drive signal transmission line arranged along the second edge are arranged between the scan circuit and the video signal transmission line, and
- the switch control circuit arranged along the second edge is arranged between the scan circuit and an edge of the substrate.

7. The display device according to claim 5, comprising a drive signal source arranged in a part of the frame area, the part adjacent to the first edge, for outputting a drive signal to be applied to the common electrode,
wherein
- the first drive signal transmission line extends in a part of the frame area, the part adjacent to the second edge with which one ends of the scan lines and the common electrodes are aligned, and
- the second drive signal transmission line extends in a part of the frame area, the part adjacent to the second edge with which other ends of the scan line and the common electrode are aligned.

8. The display device according to claim 1, wherein
- the signal line laying area has a shape that is convex in the second direction on the second edge thereof, and
- the substrate has a shape in which a distance between any point on the second edge and an edge of the substrate is equal to or shorter than a corresponding distance at a protruding end of the second edge in the second direction.

* * * * *